US010585913B2

(12) United States Patent
McManus et al.

(10) Patent No.: US 10,585,913 B2
(45) Date of Patent: Mar. 10, 2020

(54) APPARATUS AND METHOD FOR DISTRIBUTED QUERY PROCESSING UTILIZING DYNAMICALLY GENERATED IN-MEMORY TERM MAPS

(71) Applicant: Datameer, Inc., San Francisco, CA (US)

(72) Inventors: Matthew McManus, Waitsfield, VT (US); Peter Voss, Köln (DE); Holger Schulze, Halle (DE); Johannes Zillmann, Leipzig (DE); Martin Nettling, Burgliebenau (DE)

(73) Assignee: Datameer, Inc., San Francisco, CA (US)

( * ) Notice: Subject to any disclaimer, the term of this patent is extended or adjusted under 35 U.S.C. 154(b) by 435 days.

(21) Appl. No.: 15/464,232

(22) Filed: Mar. 20, 2017

(65) Prior Publication Data

US 2018/0268000 A1 Sep. 20, 2018

(51) Int. Cl.
*G06F 16/27* (2019.01)
*G06F 16/22* (2019.01)
*G06F 16/2458* (2019.01)
*G06F 16/2455* (2019.01)
*G06F 16/25* (2019.01)

(52) U.S. Cl.
CPC ........... *G06F 16/27* (2019.01); *G06F 16/221* (2019.01); *G06F 16/2471* (2019.01); *G06F 16/24561* (2019.01); *G06F 16/256* (2019.01)

(58) Field of Classification Search
None
See application file for complete search history.

(56) References Cited

U.S. PATENT DOCUMENTS 9,952,894 B1\* 4/2018 Cappiello ............... G06F 11/30
2010/0257198 A1\* 10/2010 Cohen ............... G06F 16/24564
707/770

(Continued)

OTHER PUBLICATIONS

Bjørklund, Truls A., A Confluence of Column Stores and Search Engines: Opportunities and Challenges, VLDB, Aug. 28, 2009, 7 pgs., http://www.cs.cornell.edu/database/publications/2009/usetimpaper.pdf.

(Continued)

*Primary Examiner* — Uyen T Le
(74) *Attorney, Agent, or Firm* — Cooley LLP

(57) ABSTRACT

A system has a master node with instructions executed by a master node processor to receive a query over a network from a client machine and distribute query segments over the network. Worker nodes receive the query segments. Each worker node includes instructions executed by a worker node processor to construct from a columnar file a term map characterizing a term from the columnar file, row identifications from the columnar file and a Boolean indicator for each row identification that characterizes whether the term is present in the row specified by the row identification. The term map is cached in dynamic memory. Values responsive to the query segment are collected from the term map. The values are sent to the master node. The master node aggregates values from the worker nodes to form a result that is returned to the client machine over the network.

6 Claims, 6 Drawing Sheets

(56) References Cited

U.S. PATENT DOCUMENTS

| | | | | |
|---|---|---|---|---|
| 2012/0310916 A1* | 12/2012 | Abadi | ............... | G06F 16/2456 |
| | | | | 707/713 |
| 2015/0363167 A1* | 12/2015 | Kaushik | ............... | G06F 16/221 |
| | | | | 707/753 |
| 2016/0350367 A1* | 12/2016 | Fischer | ............... | G06F 16/256 |
| 2017/0039232 A1* | 2/2017 | Jayanth | ............... | G06F 16/278 |
| 2017/0371926 A1* | 12/2017 | Shiran | ............... | G06F 16/24524 |

OTHER PUBLICATIONS

Cloudera, "Cloudera Search Overview", Cloudera Documentation, retrieved Mar. 30, 2017 from https://www.cloudera.com/documentation/enterprise/5-9-x/topics/search_introducing.html, 5 pgs.

Khandelwal, Anurag, "Succinct: Fast Interactive Queries", AMPLab, UC Berkeley, Oct. 2016, 272 pgs.

McCandless, Michael, "What is an Apache Lucene Codec?", Elastic, Engineering Blog, Apr. 8, 2015, 6 pgs., https://www.elastic.co/blog/what-is-an-apache-lucene-codec.

* cited by examiner

APPARATUS AND METHOD FOR DISTRIBUTED QUERY PROCESSING UTILIZING DYNAMICALLY GENERATED IN-MEMORY TERM MAPS

FIELD OF THE INVENTION

This invention relates generally to distributed query processing in a computer network. More particularly, this invention relates to techniques for distributed query processing utilizing dynamically generated in-memory term maps.

BACKGROUND OF THE INVENTION

Apache Parquet™ ("Parquet") is an open source column-oriented file format that is designed for fast scanning and efficient compression of data. Parquet stores data where the values in each column are physically stored in contiguous memory locations. Due to the columnar storage, Parquet can use per-column compression techniques that are optimized for each data type, and queries that use only a sub-set of all columns do not need to reach the entire data for each row.

Apache Lucene™ ("Lucene") is an open source information retrieval library that supports indexing and search as well as text analysis, numeric aggregations, spellchecking, and many other features.

Elasticsearch™ is an open source distributed search engine built on top of Lucene that provides (near) real time query and advanced analytics functionality for big data. Elasticsearch can quickly generate analytical results even on large datasets containing billions of records.

Many analytics tasks require calculations on only a sub-set of all rows in the dataset. Lucene supports calculations on sub-sets of the data by efficiently filtering the entire dataset down to just the target rows, by using the concept of an "inverted index" or a term map.

A general map is a dictionary that contains a set of unique "keys". Each key has an associated value. A term map is a special kind of map, where the keys are "terms" (e.g., words) and the values are arrays of Boolean (true/false) flags. Each column in the dataset has its own term map. There is one entry in a column's term map for each unique term (e.g., word) found in that column, for any row in the dataset. The Boolean flags indicate whether the corresponding term occurs in a specific row. As an example, consider columnar file 10 of FIG. 1. The data set has five rows, numbered 1 to 5. Each row has a single column ("gender") containing either the string "F" or "M".

Table 12 shows how the original dataset of five rows is converted into a term map with two entries, where the value for each entry is an array of five Boolean flags (one for each row). The flag's value is "Yes" if the corresponding row contains that term, otherwise the value is "No".

One can easily determine the set of rows containing "M" for the Gender; only rows 3 and 5 have their flags set to "Yes". When filtering on a text column, it is common to want to include rows where the column being used for filtering contains a target substring, versus a complete match of the entire string. For example, filtering for the "95959" ZIP code should also match a ZIP+4 entry, such as "95959-2315". In order to use a term map to filter by sub-strings, the terms in the map are pieces of the original text, which are broken up ("tokenized") into shorter sequences. One common approach is to divide text up into words, though this does not allow arbitrary sub-strings to be used for filtering.

A typical analytics query requires calculating an aggregation of some column value, where these aggregations are performed separately for each unique value in a different column. For example, the aggregation could be the average of values in an Age column, grouped by values in a Gender column. The results would typically be two values, one being the average Age for all rows where the Gender column contains "M", and the other being the average Age for all rows where the Gender column contains "F".

When using a Lucene index for aggregations, the original (pre-tokenized) values for a column are required; for example, when summing a numeric column the original numeric value is required. Typically these "row values" (which are called "document values" by Lucene) are read from the Lucene index files persistently stored on the disk. This approach is significantly slower than any of the filtering operations that use in-memory term map data.

A Lucene index consisting of term maps, row values and other data structures must be created before Elasticsearch can query the data. Creating a Lucene index is very time-consuming, and it typically requires 2-3 times more storage than the original data set. This means significant resources are required to leverage Elasticsearch for fast analytics on big data, and there is a significant delay before any new data can be queried.

Therefore, it would be desirable if one could avoid paying the cost of creating and maintaining an index for columnar data (e.g., a Lucene index).

SUMMARY OF THE INVENTION

A system has a master node with instructions executed by a master node processor to receive a query over a network from a client machine and distribute query segments over the network. Worker nodes receive the query segments. Each worker node includes instructions executed by a worker node processor to construct from a columnar file (stored locally or in a distribute file system) a term map characterizing a term from the columnar file, row identifications from the columnar file and a Boolean indicator for each row identification that characterizes whether the term is present in the row specified by the row identification. The term map is cached in dynamic memory. Values responsive to the query segment are collected from the term map. The values are sent to the master node. The master node aggregates values from the worker nodes to form a result that is returned to the client machine over the network.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
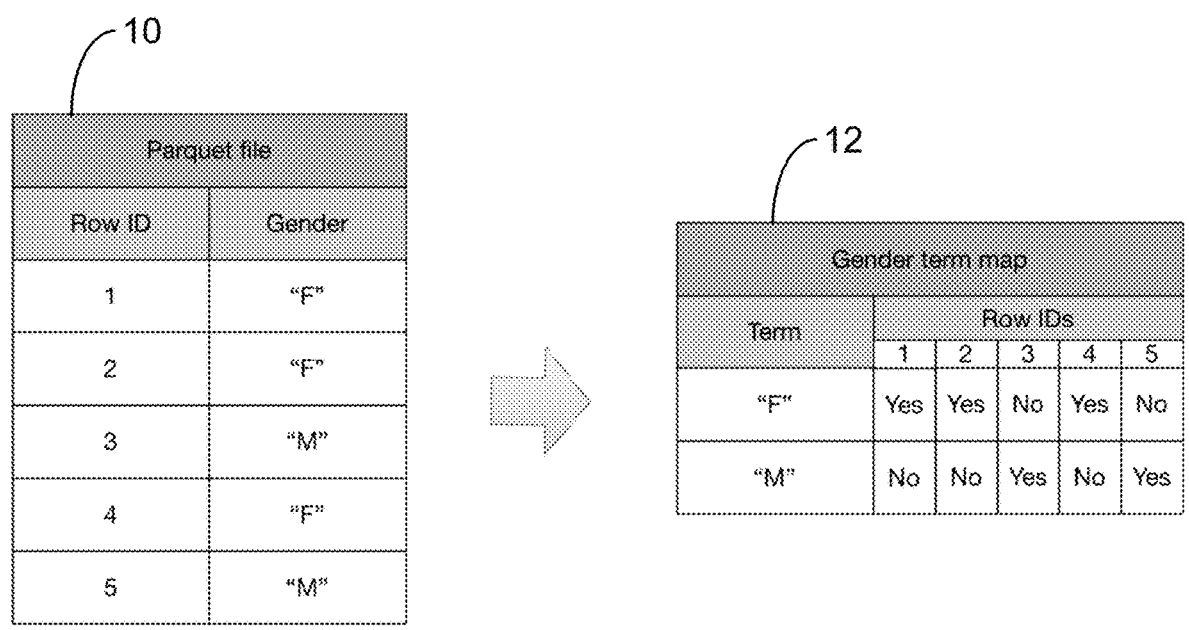
FIG. 1 illustrates conversion of columnar data to a term map.
Figure 2:
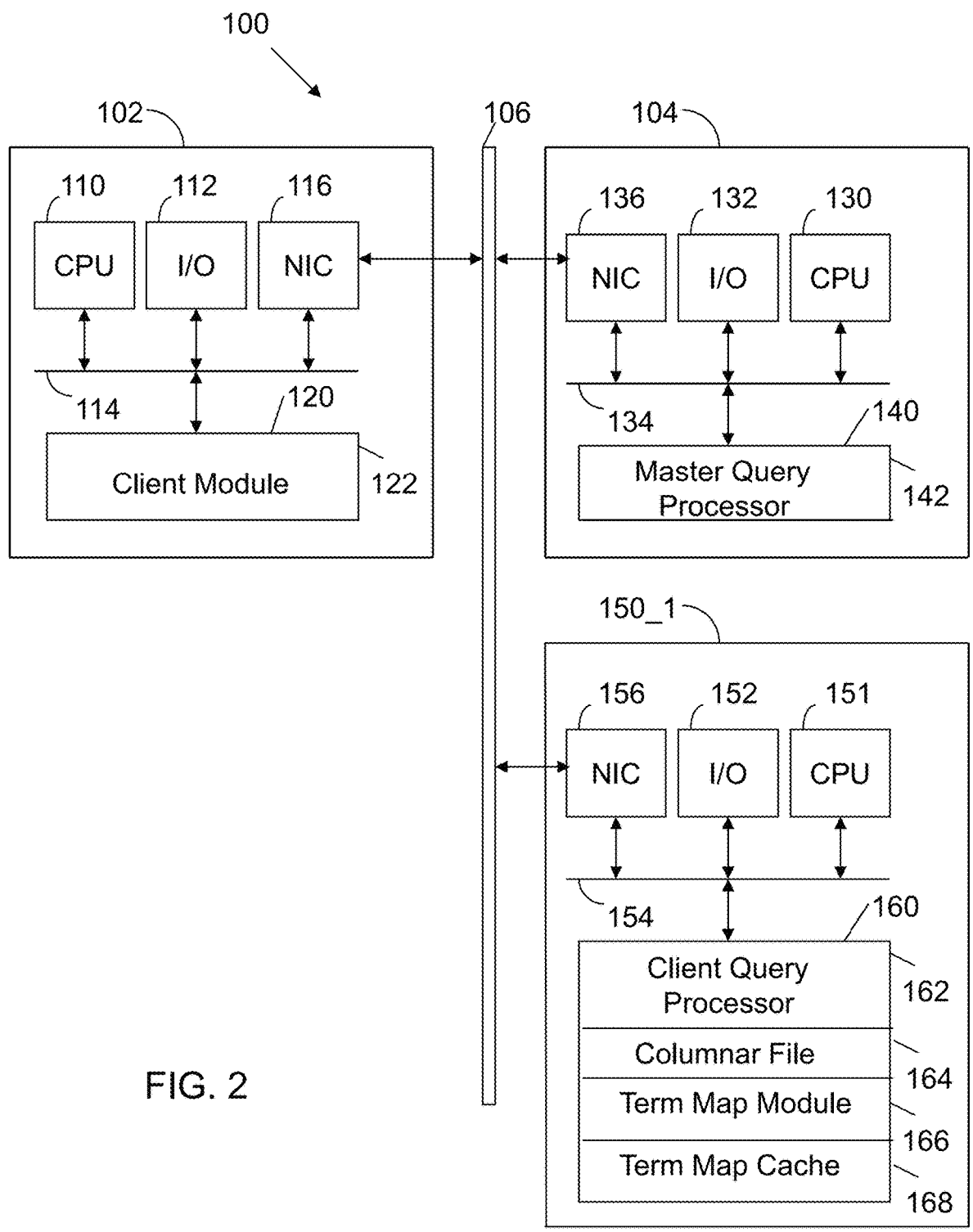
FIG. 2 illustrates a system configured in accordance with an embodiment of the invention.

FIG. 2 illustrates a system 100 configured in accordance with an embodiment of the invention. The system 100 is configured for distributed query processing. The system 100 includes a client computer 102 in communication with a master node 104 via a bus 106, which may be any combination of wired and wireless networks.

The client computer 102 includes standard components, such as a central processing unit 110 connected to input/output devices 112 via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus. The memory 120 stores a client module 122, which includes instructions executed by the central processing unit 110. The client module 122 may be a browser or application that provides connectivity to server 104 for the purpose of submitting queries. The client computer 102 may be a desktop computer, mobile computer, tablet, mobile device and the like.

The server 104 also includes standard components, such as a central processing unit 130, input/output devices 132, a bus 134 and a network interface circuit 136. A memory 140 is connected to bus 134. The memory stores a master query processor 142 with instructions executed by the central processing unit 130. The master query processor 142 develops a plan for a received query, distributes query segments to worker nodes 150_1 through 150_N, aggregates values received from worker nodes 150_1 through 150_N and supplies a final result, as demonstrated below.

FIG. 2 also illustrates worker nodes 150_1 through 150_N. Each worker nodes includes standard components, such as a central processing unit 151, input/output devices 152, bus 154 and a network interface circuit 156. A memory 160 is connected to the bus 154. The memory 160 includes instructions executed by the central processing unit 151 to implement distributed query processing in accordance with embodiments of the invention. In one embodiment, the memory 160 stores a client query processor 162. The client query processor 162 coordinates the processing of a query segment assigned to it by the master query processor 142. The memory 160 also stores a columnar file 164. Unlike the prior art, which would have an associated index for the columnar file 164, no such index exists in this case. Instead, a term map module 166 is used to dynamically generate term maps in response to a query. The term map module 166 stores generated term maps in a term map cache 168. The term map cache 168 is an in-memory resource (i.e., in non-persistent memory, such as RAM) and therefore provides results faster than a persistently stored index.

Figure 3:
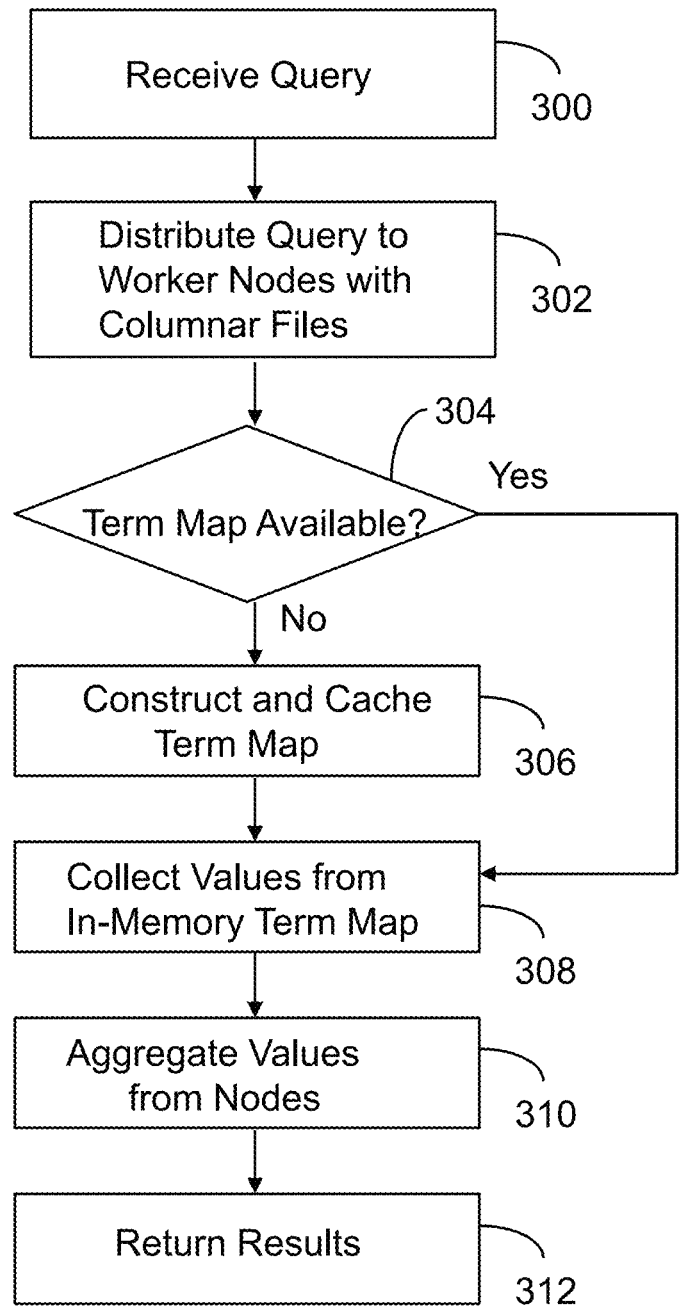
FIG. 3 illustrates distributed query processing operations performed in accordance with an embodiment of the invention.

FIG. 3 illustrates processing operations associated with an embodiment of the invention. A query is received 300. For example, a query is generated by the client module 122 of the client machine 102 and is received by the master query processor 142. Query segments are then distributed to worker nodes with columnar files 302, such as worker nodes 150_1 through 150_N, each with a columnar file 164.

At each worker node it is determined whether a required term map is available 304. The client query processor 162 may implement this operation by accessing term map cache 168. If a term map is available (304—Yes), processing proceeds to block 308. If a term map is not available (304—No), a term map is constructed and cached 306. The term map module 166 may be used to construct the term map and place it in term map cache 168.

Values are then collected from in-memory term maps 308. Examples of this operation are provided below. Values are then aggregated from the worker nodes 310. That is, the master machine 104, collects values, via network 106, from the worker machines 150_1 through 150_N and aggregates such values. A query result is then returned 312. For example, the master query processor 142 may supply client machine 102 with the query result. The foregoing operations are more fully appreciated with reference to the following examples.

The master query processor 142 and each client query processor 162 include distributed Lucene and Elasticsearch code. In addition, the master query processor 142 and each client query processor 162 include proprietary code to implement operations of the invention. This proprietary code is referred to herein as Parlene. Parlene implements the same API as a regular Lucene-based index. This API is the only communication path between Lucene and Elasticsearch. By responding to requests with the data that Elasticsearch expects, Parlene can effectively "mimic" a Lucene index using columnar data (e.g., a Parquet file).

In one embodiment, Parlene implements four API methods: fields( ), getNumericDocValues( ), getBinaryDocValues( ), and document( ). The first method is used to access each column's term map, while the last three methods return row values.

When Elasticsearch calls the fields( )method to request the term map for a column, Parlene creates the in-memory term map on-demand, in response to an analytics request. Once created, term maps are cached and re-used in each term map cache 168.

Figure 4:
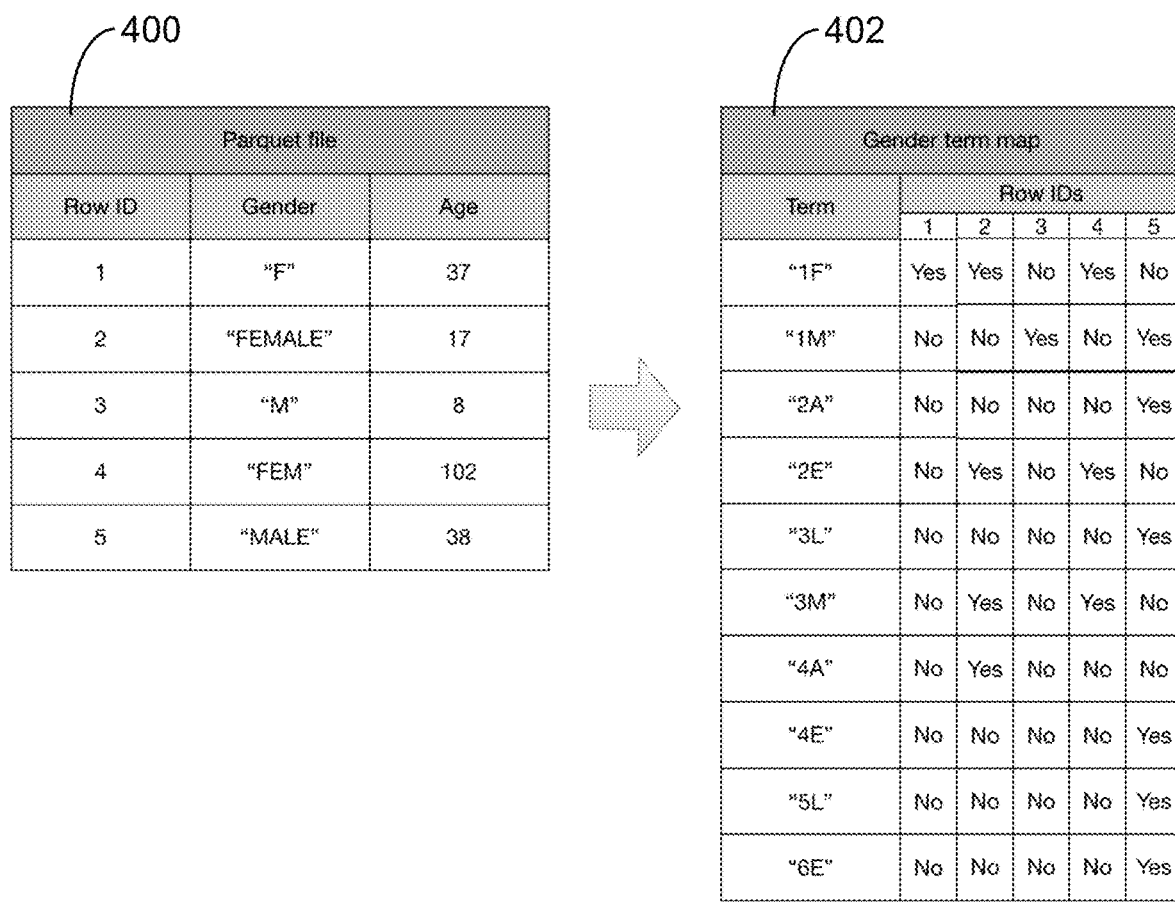
FIG. 4 illustrates conversion of columnar data to a tokenized gender term map in accordance with an embodiment of the invention.

Consider the columnar file 400 of FIG. 4. The Gender column contains strings of varying lengths. In order to support a "starts with" query such as "all entries where the Gender column starts with "FE", the text must be split into pieces via tokenization.

The keys in the resulting term map contain both a position, and the character at that position, as shown in Gender term map 402. For example, the string "FEM" for row #4 is converted into three terms: "1F", "2E", and "3M".

A query such as "all rows where the Gender column starts with "FE" becomes a test to find all rows with the value "Yes" in the Gender term map for the terms "1F" and "2E". In this example, only the columns for rows 2 and 4 have "Yes" for both of those terms. Using this approach, Parlene supports fast sub-string queries with small in-memory term maps.

Figure 5:
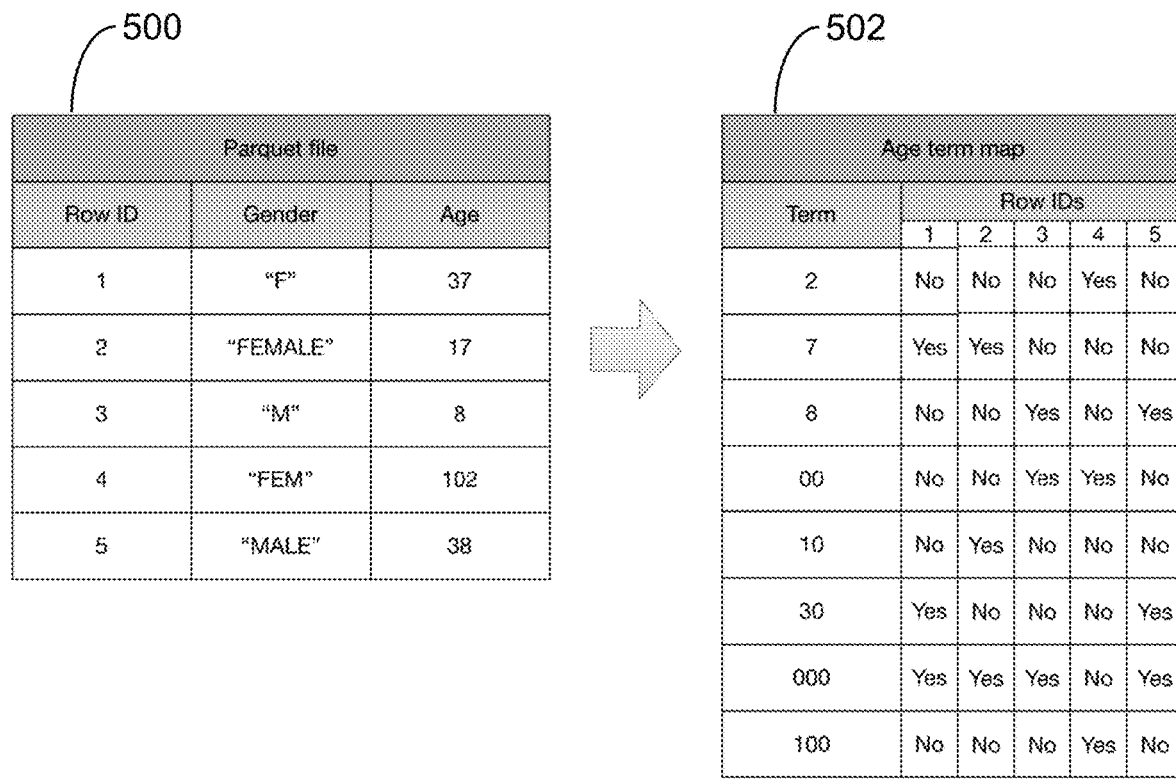
FIG. 5 illustrates conversion of columnar data to a tokenized age term map in accordance with an embodiment of the invention.

FIG. 5 illustrates columnar data 500. The Age column contains integers. In order to support a range query such as "all entries where the Age column is greater than 37", the integer values must be split into components via tokenization.

The keys in the resulting term map 502 encode both a position, and the value at that position. For example, the numeric value 38 for row #5 is converted into two terms: 8 and 30. This represents a value of 8 at the "ones position", and a value of 30 at the "tens position".

A query such as "all rows where the Age column is greater than 37" becomes a test to find all rows with the value "Yes"

in the Age term map for the terms 100 OR 90 OR 80 OR 70 OR 60 OR 50 OR 40 OR (30 AND (8 OR 9)). Any row with a 1 in the hundreds position (key is 100) is going to be greater than 35. Likewise it is known that the row is a match if it has 90, 80, and so on down to 40. If the row has a term of 30, then one must ensure that the value for that row in the ones position is greater than 7, thus the check for 8 or 9. In this example, only row 4 has "Yes" for the 100 term, and only row 5 has "Yes" for the terms 30 and 8.

Using this approach, Parlene supports fast numeric ranges queries with small in-memory term maps. If a request is made to get the row value for a numeric column, and that column has a term map, then Parlene can reconstruct the original value. Given the target row number, each term that has "Yes" for that row can be combined to create the original value. For example, if a request is made for the Age column value of row #2, then the Age term map contains the terms 000, 10, and 7 with "Yes" for row #2. Combining these gives us the original value of 17. Using this approach, Parlene supports fast retrieval of numeric values from the in-memory term map, without requiring a disk access.

What follows is a step by step description of how a query is processed using Parlene. A request may originate from the client module 122. For example, the request may be via an analytics query API supported by the master query processor 142. Consider a request for the total payments made by women for each state. The SQL equivalent would be SELECT state, SUM(payment) FROM index WHERE gender='F' GROUP BY state;

The analytics query API converts this into an Elasticsearch request so that Elasticsearch can compute the results. Elasticsearch is designed for processing such queries in real time by using indexing technology. The aggregation request, which is sent to an Elasticsearch node as JSON looks like:

```
{
  "query": {
    "filter": [
      { "term": { "gender": "F" }
    ]
  },
  "aggs": {
    "bucket_by_state": {
      "terms": {
        "field": "state"
      },
      "aggs": {
        "sum(payment)": {
          "sum": {
            "field":"payment"
          }
        }
      }
    }
  }
}
```

Elasticsearch distributes this request to all nodes in the Elasticsearch cluster that contain one or more pieces (shards) of the index. As previously indicated, the master query processor 142 includes an Elasticsearch code segment that communicates with Elasticsearch code segments of each client query processor 162. In particular, the Elasticsearch query parser communicates with each shard of the index that contains one or more columnar files 164 (e.g., Parquet files). Note here that the Elasticsearch query processor relies upon columnar file locations instead indexes for the columnar files.

Each worker node then makes a request to Parlene (via a ParleneLeafReader) for the "gender" term map. Parlene first checks to see if this term map already exists in the in-memory cache. If so, it is returned immediately. This corresponds to the check 304 of FIG. 3. Otherwise Parlene must first build a term map from the "gender" column in the Parquet file. This corresponds to operation 306 of FIG. 3.

The ParleneLeafReader makes a request to a Parquet-Bridge to build the term map. The ParquetBridge is code configured in accordance with an embodiment of the invention that uses Parquet files instead of Lucene indexes as the source for both term maps and row values. It produces optimized in-memory data structures for term maps. Elasticsearch can now quickly provide fast analytics directly from Parquet files without having to first create Lucene indexes.

More particularly, the ParquetBridge makes a request to Parquet to iterate over every record in the "gender" column. Thus, the proprietary code of the ParquetBridge leverages a native capability of the open source Parquet code that is designed for quick reading from individual columns. For each record, Parquet materializes (creates in memory) the value for that record's "gender" column. The ParquetBridge creates the term map during this iteration, by first generating terms from the raw data read from the file (via tokenization), and then setting the appropriate flag for each row containing the corresponding term.

Once all records have been processed, the resulting term map is returned by the ParquetBridge to the ParleneLeafReader. The ParleneLeafReader adds the term map to the in-memory cache, and returns it to Elasticsearch.

The exemplary query is only looking at females and therefore Elasticsearch only looks at the results from the term map for gender "F". These are the row IDs 1, 2 and 4 in the current example. Elasticsearch iterates over every row for gender "F" by the ID found in the term map. This is done by a Lucene "HitCollector". For each such row, a request is made to Parlene to return the "state" and "payment" column values from the row that is defined by the ID.

The ParleneLeafReader calls the ParquetBridge to extract these column values for the row. The ParquetBridge has a choice of how to extract these values. If the corresponding column has a term map in the cache, then the value can be reconstructed using the term map, as described previously. Otherwise, a request to Parquet can be made to materialize the requested column for the requested row (by its id).

The Elasticsearch HitCollector adds each "payment" value to the appropriate group. There is one group for each unique value in the "state" column. Each Elasticsearch node returns the HitCollector results for each shard to the node that originated the query, the master node 104, in this case.

The originating Elasticsearch node combines the per-shard results to create a final result, which is then returned to the requester, client machine 102, in this example.

Figure 6:
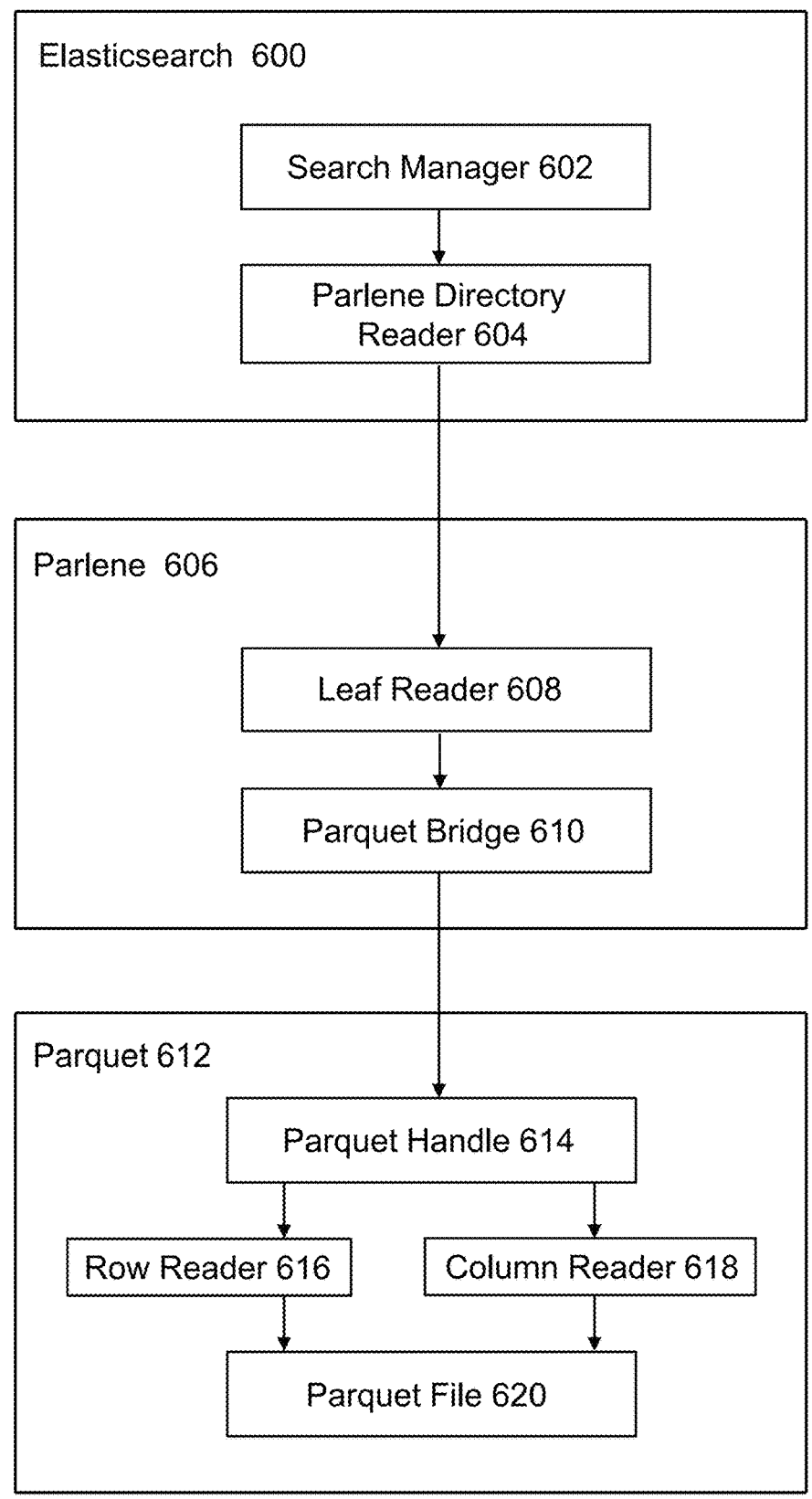
FIG. 6 illustrates interoperable executable code components utilized in accordance with an embodiment of the invention.

FIG. 6 illustrates interoperable executable code components utilized in accordance with an embodiment of the invention. Elasticsearch 600 includes a search manager 602. In one embodiment, each Java® Virtual Machine (JVM) has one search manager 602. This class is responsible for instantiating the correct directory reader. Each directory reader organizes one shard. The Parlene directory reader 604 manages the Parlene specific caches (e.g., term map cache 168. Each instance provides one Parlene leaf reader.

Parlene 606 includes a leaf reader 608, which corresponds to Lucene's leaf reader. It is mainly responsible for providing row values and terms for each requested column. Parlene also includes a Parquet Bridge 610. The Parquet Bridge 610 provides methods for reading relevant data from a columnar file, in this case a Parquet file. The bridge 610 has two main tasks. The first is to read and analyze a complete column when needed and to read concrete rows requested by Lucene's collectors.

Parquet 616 includes a Parquet handle 614, which provides methods to access the Parquet file. It is responsible for providing a row reader 616 and a column reader 618. The row reader 616 reads and materializes only the requested row and the requested columns. This causes many random accesses. The column reader 618 materializes the entire column and therefore reduces the number of random accesses per row. The row reader 616 and column reader 618 operate on a Parquet file 620.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
    a master node with instructions executed by a master node processor to receive a query over a network from a client machine and distribute query segments over the network; and
    a plurality of worker nodes to receive the query segments, wherein each worker node includes instructions executed by a worker node processor to
        construct from a columnar file a term map characterizing a term from the columnar file, row identifications from the columnar file and a Boolean indicator for each row identification characterizing whether the term is present in the row specified by the row identification, wherein the term map is dynamically constructed in response to a query segment,
        cache the term map in dynamic memory,
        collect from the term map values responsive to the query segment, and
        send the values to the master node, wherein the master node aggregates values from the plurality of worker nodes to form a result that is returned to the client machine over the network.

2. The system of claim 1 wherein the instructions executed by the processor to construct include instructions to form a term as a tokenized value of a complete term from the columnar file, wherein the tokenized value is associated with row identifications from the columnar file and a Boolean indicator for each row identification characterizing whether the tokenized value is present in the row specified by the row identification.

3. The system of claim 1 wherein each worker node includes instructions executed by the worker node processor, prior to the collect operation, to identify within the dynamic memory a cached term map responsive to the query segment, collect from the cached term map values responsive to the query segment, and send the values to the master node.

4. The system of claim 1 wherein the columnar file is a Parquet file.

5. The system of claim 4 wherein the instructions executed by a worker node processor to construct from a locally stored columnar file a term map include instructions to interact with Elasticsearch code modules.

6. The system of claim 4 wherein the instructions executed by a worker node processor to construct from a locally stored columnar file a term map include instructions to interact with a Parquet row reader and a Parquet column reader.

* * * * *